(12) United States Patent
Courpet et al.

(10) Patent No.: US 8,947,846 B2
(45) Date of Patent: Feb. 3, 2015

(54) DEVICE FOR PROTECTING PIPING FROM LIGHTNING

(75) Inventors: Alexis Courpet, Fronton (FR); Thomas Barre, Toulouse (FR); Matthieu Biteau, Toulouse (FR); Olivier Bourbon, Aucamville (FR); Jean Marc Roques, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 135 days.

(21) Appl. No.: 13/383,436

(22) PCT Filed: Jul. 13, 2010

(86) PCT No.: PCT/FR2010/051481
§ 371 (c)(1),
(2), (4) Date: Apr. 4, 2012

(87) PCT Pub. No.: WO2011/007100
PCT Pub. Date: Jan. 20, 2011

(65) Prior Publication Data
US 2012/0181384 A1    Jul. 19, 2012

(30) Foreign Application Priority Data
Jul. 16, 2009    (FR) .................................... 09 54938

(51) Int. Cl.
| H05F 3/00 | (2006.01) |
| B64D 45/02 | (2006.01) |
| F16L 25/01 | (2006.01) |
| F16L 25/02 | (2006.01) |
| F16L 27/12 | (2006.01) |
| F16L 39/04 | (2006.01) |
| H02G 13/00 | (2006.01) |

(52) U.S. Cl.
CPC ................. *B64D 45/02* (2013.01); *F16L 25/01* (2013.01); *F16L 25/02* (2013.01); *F16L 27/12* (2013.01); *F16L 39/04* (2013.01); *H02G 13/00* (2013.01)
USPC .......................................................... 361/215

(58) Field of Classification Search
USPC ......................................................... 361/215
See application file for complete search history.

(56) References Cited

U.S. PATENT DOCUMENTS

| 4,654,747 A | 3/1987 | Covey |
| 4,985,801 A | 1/1991 | Hellard et al. |
| 2004/0201217 A1* | 10/2004 | Mobley et al. ................ 285/417 |
| 2007/0145190 A1 | 6/2007 | Villegas et al. |
| 2008/0013246 A1 | 1/2008 | Berenguer Monge et al. |
| 2009/0071676 A1 | 3/2009 | Fernandez Vieira |
| 2009/0102187 A1 | 4/2009 | Carns et al. |

FOREIGN PATENT DOCUMENTS

| EP | 0 217 313 | 4/1987 |
| EP | 0 297 990 | 1/1989 |
| EP | 1 939 088 | 7/2008 |
| EP | 1 964 777 | 9/2008 |
| EP | 2 034 228 | 3/2009 |
| EP | 2 053 294 | 4/2009 |
| WO | 2006 049956 | 5/2006 |

* cited by examiner

*Primary Examiner* — Rexford Barnie
*Assistant Examiner* — Ann Hoang
(74) *Attorney, Agent, or Firm* — Oblon, Spivak, McClelland, Maier & Neustadt, L.L.P.

(57) ABSTRACT

A device for protecting piping from lightning. The piping includes tubular metal sections connected to each other by connection parts, a first portion of the connection parts being plastic material parts and a second portion of the connection parts being metal parts.

20 Claims, 3 Drawing Sheets

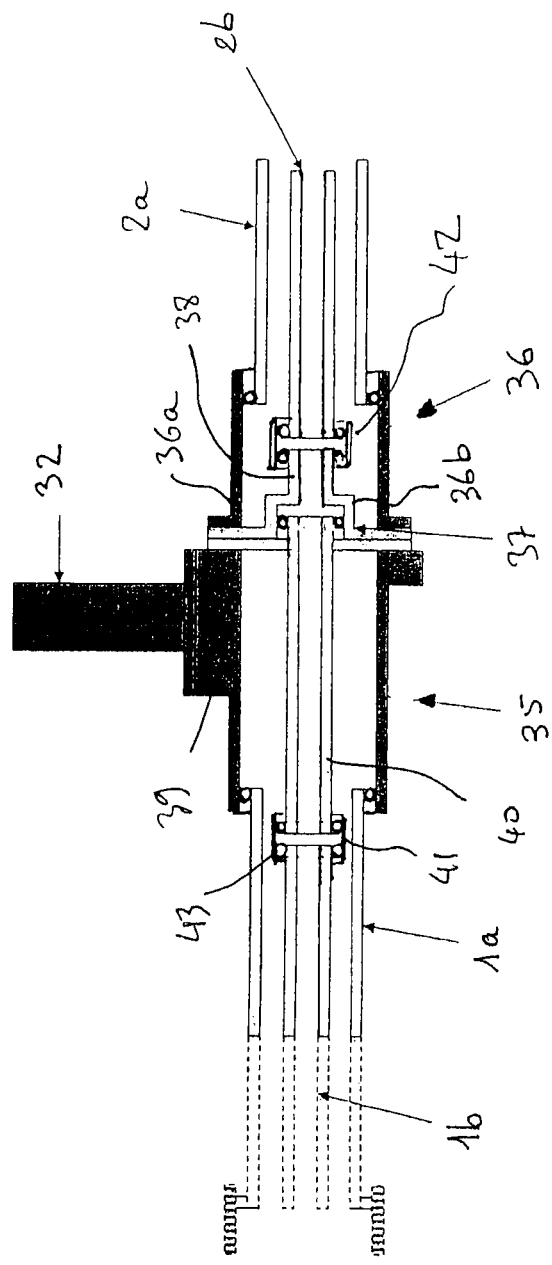

DEVICE FOR PROTECTING PIPING FROM LIGHTNING

FIELD OF THE INVENTION

The present invention relates to a device for protecting piping from lightning and more precisely a device for protecting piping intended to transport fuel in aircraft.

The invention more particularly applies to aircraft whose primary structure and fuselage are comprised of a composite, non-conductive or low conductive material.

BACKGROUND OF THE INVENTION

For an aircraft containing a fuselage made from composite material, the metal piping is more conductive than the fuselage and there is a risk of the lightning current travelling within the metal tubes making up the fuel pipes.

The piping must therefore be made less conductive than the fuselage.

However, electrical continuity must be preserved and the piping must be grounded, so that it does not become charged with static electricity.

SUMMARY OF THE INVENTION

The solution proposed by the present invention comprises the integration of insulating parts or parts more electrically resistant than the structure into the fuel transport pipes.

More precisely, the present invention proposes a device for protecting piping from lightning, for which, the piping being comprised of tubular metal sections connected to each other by connection parts, a first portion of the connection parts are plastic material parts and a second portion of the connection parts are metal parts.

Advantageously, the piping tubes being double skin tubes containing an inner tube and an outer tube concentric to one another, the connection parts comprise an inner part for connecting two inner tubes and an outer part for connecting two outer tubes.

More precisely, at least some of the connection parts made from plastic material comprise abutment means capable of maintaining a gap intended to prevent the formation of an electric arc between the tubes that these connection parts connect.

According to one particular embodiment, with the sealing means between the tubes and the connection parts containing electrically insulating O-rings, the device comprises electrical connection means between at least some of the tubes and at least some of the connection parts.

According to one particular embodiment, the plastic connection parts are made from a plastic material containing an insulating polymer and a load of conductive material so as to provide the material with sufficient conductive properties to evacuate the static electricity accumulated by the tubes.

Advantageously, this load is a carbon fibre load.

According to one particular embodiment of the invention, with the sections being connected nearby the attachment bearing supports for attachment to the structure, a first section is received by a metal part, the other being received by a plastic part, said metal part and plastic part being assembled together.

Preferably, the metal part is a connector attached to the attachment bearing support.

Advantageously, the plastic part comprises at least one sleeve attaching to the connector.

In the example of a double skin pipe, the plastic part comprises an outer sleeve and an inner sleeve, the inner sleeve comprising a first portion forming a tip for receiving an end of an inner tube of the first section or of an extension tube of said inner tube and a second portion forming a tip for connecting an inner tube of the second section.

According to this embodiment, this connection forms a mixed metal/plastic connection.

The invention also relates to an aircraft comprising sections of metal piping and a device for protecting piping according to the invention, for which the sections of piping are connected, at their first end, by means of insulating connection parts and, at their second end, by means of conductive connection parts and electrically connected to the structure, so as to produce segments of piping containing two sections, each connected to the conducting ground of the aircraft, said segments being electrically insulated from each other.

Given that the connection parts comprise electrically insulating O-rings, electrical connection means are preferably positioned between the tubes and the metal connection parts.

According to a first alternative embodiment, the aircraft can be such that it comprises sections of metal piping and a device for protecting piping comprising charged plastic connection parts, for which the majority of sections of piping are connected by means of charged plastic connection parts, with metal connection parts electrically connected to the structure and being positioned from place to place to locally connect the piping to the conducting ground of the aircraft.

Preferably in this example, the metal connection parts are positioned at approximately fifteen meter intervals along the piping.

According to a second alternative embodiment, the aircraft is such that it comprises sections of metal piping and a device for protecting piping comprising conductive parts and insulating parts, for which the sections of piping are connected, at their first end, by means of insulating connection parts and, at their second end, by means of conductive connection parts and electrically connected to the structure, so as to produce segments of piping, each section of which is connected to the conducting ground of the aircraft at one end and insulated at the other end, said segments being electrically insulated from each other.

The invention also relates to a method for protecting the piping of an aircraft from lightning, this piping being made from a plurality of tubular sections connected to each other by connection parts characterised in that, a first portion of the connection parts being made from a non-conductive material and a second portion of the connection parts being made from a conductive material, the tubular sections are connected to each other by alternating conductive connection parts that are electrically connected to the aircraft structure and non-conductive connection parts.

Alternatively, the method is a method for protecting the piping of an aircraft from lightning, this piping being made from a plurality of tubular sections connected to each other by highly resistant connection parts capable of evacuating electrostatic charges, for which the tubular sections of said highly resistant connection parts are connected by means of connection straps and a metal grounding connection part is periodically positioned at 10 to 20 meter intervals along the piping and preferably approximately every 15 meters of piping.

BRIEF DESCRIPTION OF THE DRAWINGS

Other characteristics and advantages of the invention shall be better understood upon reading the description given of a non-limitative example of embodiment of the invention, provided with reference to the figures which represent:

in FIG. 5: an alternative embodiment of the invention.

DETAILED DESCRIPTION OF THE INVENTION

The present invention is described within the scope of piping transporting kerosene in the pressurised portion of an aircraft.

Figure 1:
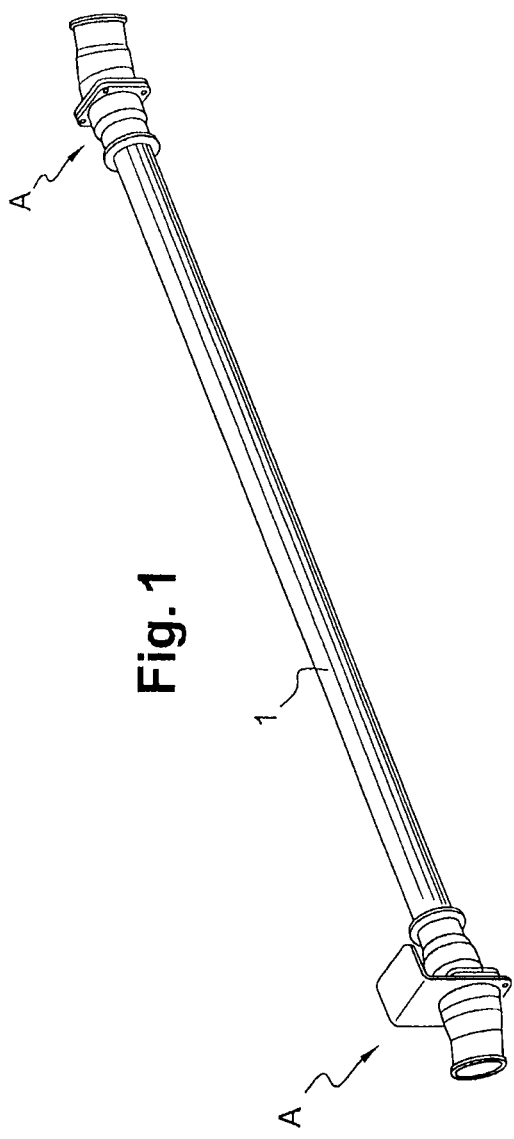
in FIG. 1: a perspective view of a section of piping between connection parts.

FIG. 1 represents a section 1 of such a kerosene feed pipe of an aircraft.

This is a tubular section manufactured from tubes of any cross-section, whether cylindrical or other.

This section is fitted at its ends with connection parts A enabling the piping to be attached to the structural elements of the aircraft along which the piping travels.

Figure 2:
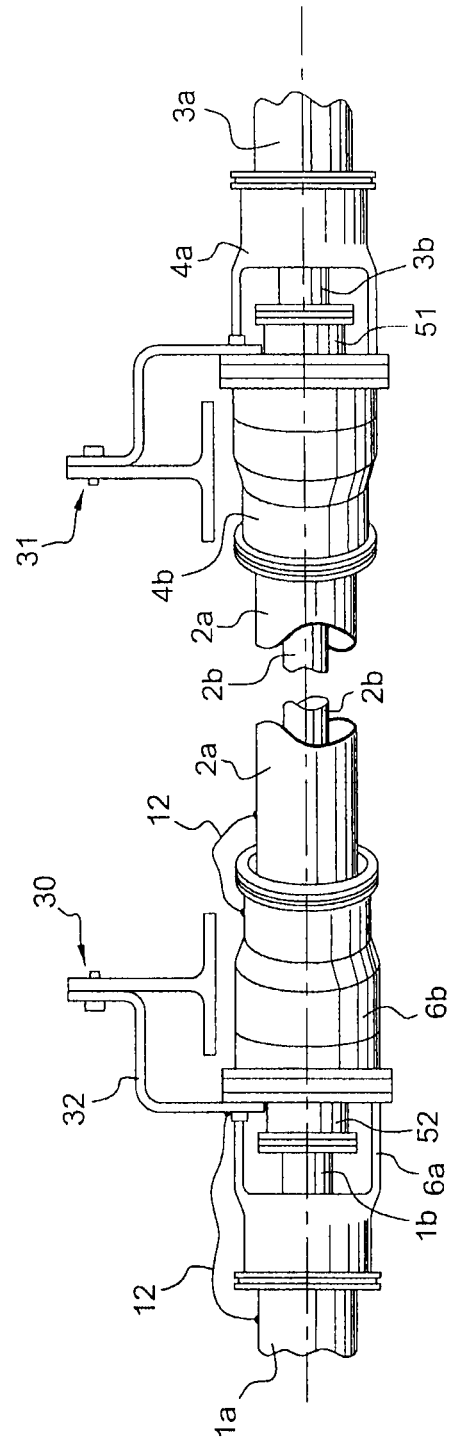
in FIG. 2: a side view of the connections of several sections.

A more detailed example representing a section of tubes 2a, 2b and two tips of sections 1a, 1b and 3a, 3b is provided in FIG. 2.

In order to comply with safety standards, the fuel piping is constituted from double skin tubes 1a, 1b, 2a, 2b, 3a, 3b, i.e. the tube transporting the kerosene 1b, 2b, 3b is protected by a second tube 1a, 2a, 3a which recovers any possible leaks and contains any external attacks, in particular fire.

The device of the invention must be resistant to kerosene, the outer skin also being required to withstand a temperature of 1100° C. for 5 minutes.

This outer skin must enable the evacuation of electrostatic charges towards the metal structure 30, 31 of the aircraft, avoid the formation of electric arcs and enable the use of existing standard parts.

Usually, the outer tube is made from aluminium and the inner tube is made from titanium.

As previously stated, in the example of an aircraft principally made from composite materials, the electrical resistivity of the structure is high, which means that the metal piping becomes a possible pathway for lightning.

The purpose of the connection parts of this invention is to create obstacles preventing the lightning from passing via the piping.

In order to achieve this, some connection parts, parts 4a, 4b and 51 in FIG. 2 are parts made from an insulating plastic material.

The electrical continuity is therefore interrupted at the point of connection of the section comprising tubes 2a, 2b and the section comprising tubes 3a, 3b.

Figure 3:
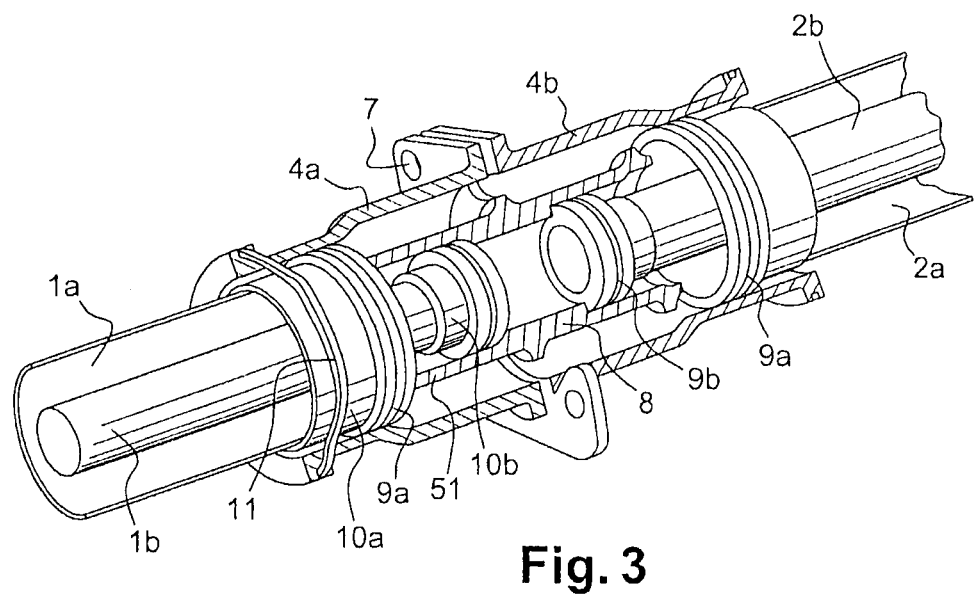
in FIG. 3: a perspective view of a cross-section of a connection of sections of the invention.

The connection parts represented via a perspective cross-sectional view in FIG. 3 remain traditional in their mechanical tube-connecting function.

An inner part 51 connects the inner tubes 1b and 2b terminating in sleeves 10a fitted with an O-ring seal 9b.

The inner part comprises shoulders of the abutment 8, which prevent the tubes from moving to within a certain distance of each other, this distance being lower than a given electrical insulation distance according to the applicable standards and in this case, equal to 25 mm of direct current insulation surface length to avoid gliding arc discharge.

The outer part in this case is divided into two portions 4a and 4b produced so that a minimum distance of 10 mm of air clearance is complied with between the inner part and the outer parts.

This part divided into two portions receives the outer tubes 1a, 2a at its two ends, the outer tubes also being fitted with terminal tips 10a having outer O-rings 9a so that the tubes can slide within the connection parts to compensate clearance or dilatation while preserving the desired seal.

These plastic parts enable mechanical connection to the structure by attachment means such as the holes 7 and the electrical insulation of the fuel piping at one of the 2 ends of a section.

Figure 4:
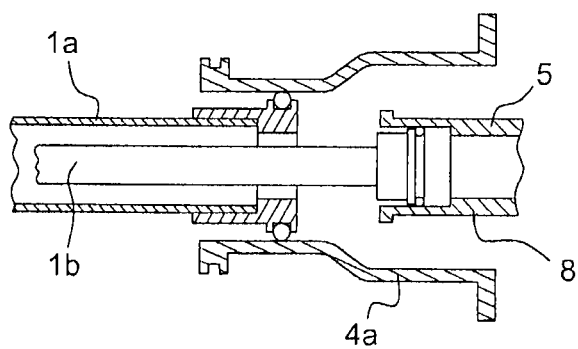
in FIG. 4: a detailed side view of a cross-section of a connection.

FIG. 4 represents a cross-section view of a portion of the connection showing the possible displacement of tubes 1a, 1b in relation to the connection parts.

Referring back to FIG. 2, at the other end of the tubes, the connection parts 6a, 6b are comprised of metal elements in order to evacuate electrostatic charges.

Due to the O-rings located between the tubes and the connection parts, the electrostatic charges cannot be evacuated towards the structure at the tube connection.

In order to overcome this problem, electrical connection means such as metal straps welded onto the tubes and/or the connection parts or connected to the connection parts via screw/nut assemblies are provided to enable electrical continuity, in particular between the connection parts 6a, 6b and the tubes 1a or between the tubes and the bearing support 32.

Due to this assembly, for which two sections of tubes are connected together to the conducting ground, yet insulated from the other sections by electrically insulating connection parts, the lightning currents cannot enter into the fuel line as the piping on either side of the conductive connection are insulated from the structure.

At the level of the metal connection part, the metallisation straps are, for example, made from copper with protective tinning.

FIG. 5 corresponds to an alternative embodiment of the invention particularly suited to the connection of sections at the attachment bearing supports 32 on the structure 30.

According to this alternative embodiment, a first section is received by a metal part 35, the other being received by a plastic part 36, said metal part and plastic part 35, 36 being assembled together.

The metal part 35 is in this example a connector attached to the bearing support 32, for example by means of an attachment plate 39 screwed onto the support.

This metal part assures the connection of the first section and the mechanical attachment of this section to the structure.

The plastic part 36 attaches to the metal part and assures the connection of the second section and for this purpose comprises at least one sleeve 36a being attached to the connector 35.

In the example of a double skin piping with an inner tube and an outer tube, the plastic part comprises an outer sleeve 36a for connection to the outer tube and an inner sleeve 36b for connection to the inner tube.

In order to connect the first inner tube and the second inner tube, the inner sleeve 36b comprises a first portion forming a tip 37 for receiving an end of an inner tube of the first section or of an extension tube 40 of said inner tube and a second portion forming a tip 38 for connecting an inner tube of the second section.

The extension tube 40 is useful when using inner and outer tubes of the same length and when the inner tube must be extended to ensure the continuity of fuel transport.

Within the scope of the invention, the extension tube can be attached within the connector 35 formed by the metal part, for example using a strut.

In this case, the strut is preferably metallic so as to connect the end of the inner tube of the first section to the structure and therefore to the conducting ground of the aircraft.

In order to overcome the differences in tube lengths, all links use clearance compensation devices 41, 42 in the form of O-ring tubular sleeves 43.

On the first section side, ground straps can be provided to interlace the clearance compensation device and place tubes within and outside of the conducting ground.

According to the embodiment in FIG. 5, the connection forms a mixed metal/plastic connection.

The aircraft therefore comprises sections of metal piping and a device for protecting piping, for which the sections of piping are connected, at their first end, by means of insulating connection parts and, at their second end, by means of conductive connection parts and electrically connected to the structure, so as to produce segments of piping, each section of which is connected to the conducting ground of the aircraft at one end and insulated at the other end, said segments being electrically insulated from each other.

This variation enables the piping to be fully segmented in electrical terms to prevent the passing of any lightning current while evacuating electrostatic charges at each section.

With regard to the insulating connector, the insulating connectors are advantageously comprised of PEEK reinforced with fibres.

In the event that one out of every two connectors is an insulator, the fibres do not need to be conductive.

According to one particular embodiment, a solution is considered for which plastic connectors are designed so as to provide sufficient conductivity properties to evacuate the static electricity charges caused by liquid friction within the manifolds.

By nature, PEEK is too great an insulator, which is why it must be loaded with conductive fibres such as carbon fibres.

For the range of resistivity required for an aircraft made from a composite material, a 30% carbon fibre load (by weight) of the material of the connection part enables the electrostatic charges to be evacuated without the part becoming capable of conducting lightning.

This leads to the production of plastic parts with high levels of resistivity, which preserve sufficient conductive properties to evacuate the charges accumulated on the tubes, however which also preserve sufficient resistive properties so as not to pass lightning.

For the mechanical properties of the parts, the use of long fibres is preferred.

Similarly, the longer the fibres, the better the level of electrical conductivity.

However, long fibres are more difficult to inject due to them becoming wedged or blocking the screw that pushes the PEEK into the mould.

A fibre load of approximately 3 to 5 mm represents a value that overcomes the problems encountered when manufacturing parts with sufficient resistive properties so as not to act as a pathway for lightning, however with sufficient conductive properties to evacuate the static electricity charges.

Once the level of carbon and the fibre length have been defined, it must be ensured that the material remains homogeneous during the moulding process. Carbon pockets are often found as the PEEK is sensitive to temperature variations when in viscous/liquid phase.

Such a solution enables the use of connection parts that remain identical throughout.

The solution for manufacturing the parts involves a material that is resistant to fuel with the choice being based on a PEEK loaded with short fibres.

By dosing the concentration of short fibres, the desired levels of resistance to fire and stress, and electrical conductivity/resistivity are obtained.

The invention therefore offers a low-weight solution for protecting from lightning currents and for evacuating electrostatic currents.

However, the use of metal connection parts remains in this case mandatory with regard to the design standards which require the piping to be directly grounded approximately every 15 meters.

Furthermore, in this case and in order to comply with this standard, manifolds will be mostly connected via charged plastic connection parts with high resistivity properties, and a metal connection part shall be periodically positioned, approximately every 15 m, for electrical grounding.

The invention claimed is:

1. A device for protecting piping from lightning, comprising:
    the piping including tubular metal sections connected to each other by connection parts,
    wherein a first type of the connection parts is plastic material parts and a second type of the connection parts is metal parts,
    wherein the piping including the tubular metal sections is made from double skin tubes, each of the tubular metal sections including an inner tube and an outer tube that are concentric to one another,
    wherein the connection parts include an inner part to connect two inner tubes of adjacent tubular metal sections and an outer part to connect two outer tubes of the adjacent tubular metal sections, and
    wherein the inner tube of at least one tubular metal section and the outer tube of the at least one tubular metal section are slidable relative to each other along an axial direction of the at least one tubular metal section.

2. The device for protecting piping according to claim 1, wherein at least one of the first type of the connection parts made from plastic material includes an abutment member to maintain a gap to prevent formation of an electric arc between the two inner tubes of the adjacent tubular metal sections connected via the abutment member.

3. The device for protecting piping according to claim 2, wherein the abutment member includes a raised portion with a decreased inner diameter to prevent the two inner tubes of the adjacent tubular metal sections from moving towards each other closer than a distance of the gap.

4. The device for protecting piping according to claim 1, further comprising a sealing member between the tubes of the piping, and an electrical connection between at least one tube of the tubes and at least one of the connection parts,
    wherein the connection parts include electrically insulating O-rings.

5. The device for protecting piping according to claim 1, wherein the plastic connection parts are made from a plastic material including an insulating polymer and a load of conductive material to provide the plastic connection parts with sufficient conductive properties to evacuate static electricity accumulated by the tubes.

6. The device for protecting piping according to claim 5, wherein the load is a carbon fiber load.

7. An aircraft comprising:
sections of metal piping; and
a device for protecting piping according to claim 5,
wherein a majority of sections of piping are connected by charged plastic connection parts, with metal connection parts electrically connected to a structure of the aircraft and positioned at intervals to locally connect the piping to a conducting ground of the aircraft.

8. The aircraft according to claim 7, wherein the metal connection parts are positioned at approximately fifteen meter intervals along the piping.

9. The device for protecting piping according to claim 1, wherein the tubular metal sections are connected to attachment bearing supports that are attached to a structure via at least one connection part of the connection parts,
wherein a first section of the tubular metal sections is received by a metal part of the at least one connection part,
wherein a second section of the tubular metal sections is received by a plastic part of the at least one connection part, and
wherein the metal part and plastic part are assembled together to form the at least one connection part.

10. The device for protecting piping according to claim 9, wherein the metal part is a connector attached to the attachment bearing support.

11. The device for protecting piping according to claim 10, wherein the plastic part includes at least one sleeve attaching to the connector.

12. The device for protecting piping according to claim 11, wherein the plastic part includes an outer sleeve and an inner sleeve, the inner sleeve having a first portion forming a tip to receive an end of an inner tube of the first section or an end of an extension tube of the inner tube of the first section, and the inner sleeve having a second portion forming a tip to connect to an inner tube of the second section.

13. The device for protecting piping according to claim 9, wherein the connection forms a mixed metal/plastic connection.

14. An aircraft comprising:
additional sections of metal piping; and
a device for protecting piping according to claim 9,
wherein the additional sections of piping are connected, at respective first ends, by insulating connection parts and, at respective second ends, by conductive connection parts to be electrically connected to a structure of the aircraft, to produce segments of piping, each of the additional sections of piping connected to a conducting ground of the aircraft at one end and insulated at the other end, the segments being electrically insulated from each other.

15. An aircraft comprising:
additional sections of metal piping; and
a device for protecting piping according to claim 1,
wherein the additional sections of piping are connected, at respective first ends, by insulating connection parts and, at respective second ends, by conductive connection parts to be electrically connected to a structure of the aircraft, to produce segments of piping including two sections of metal piping, each of the sections being connected to a conducting ground of the aircraft, the segments being electrically insulated from each other.

16. The aircraft according to claim 15, wherein the connection parts include electrically insulating O-rings and electrical connection members positioned between the tubes and the metal connection parts.

17. The device for protecting piping according to claim 1, wherein the tubular metal sections of the piping are connected to each other by the connection parts in an alternating manner so that one end of each of the tubular metal sections is connected to the first type of the connection parts and another end of each of the tubular metal sections is connected to the second type of the connection parts.

18. The device for protecting piping according to claim 1, wherein the tubular metal sections are electrically connected to the second type of the connection parts via metal connection straps at intervals of 10 to 20 meters along the piping.

19. The device for protecting piping according to claim 1, wherein the inner tube of the at least one tubular metal section includes an electrically insulating O-ring in sliding contact with a first inner part of the connection parts, and
wherein the outer tube of the at least one tubular metal section includes an electrically insulating O-ring in sliding contact with a first outer part of the connection parts.

20. A device for protecting piping from lightning, comprising:
the piping including tubular metal sections connected to each other by connection parts,
wherein a first type of the connection parts is made from a non-conductive material and a second type of the connection parts is made from a conductive material,
wherein the piping including the tubular metal sections is made from double skin tubes, each of the tubular metal sections including an inner tube and an outer tube that are concentric to one another,
wherein the connection parts include an inner part to connect two inner tubes of adjacent tubular metal sections and an outer part to connect two outer tubes of the adjacent tubular metal sections, and
wherein the inner tube of at least one tubular metal section and the outer tube of the at least one tubular metal section are slidable relative to each other along an axial direction of the at least one tubular metal section.

* * * * *